Jan. 27, 1970  G. J. GALIK  3,491,803
MACHINE FOR FILLING WITH LIQUIDS CONTAINERS
HAVING DEFORMABLE SIDE WALLS
Filed Oct. 3, 1966  3 Sheets-Sheet 1

GEZA J. GALIK
INVENTOR.

BY Edward L. Bell

ATTORNEY

Jan. 27, 1970  G. J. GALIK  3,491,803
MACHINE FOR FILLING WITH LIQUIDS CONTAINERS
HAVING DEFORMABLE SIDE WALLS
Filed Oct. 3, 1966  3 Sheets-Sheet 2

GEZA J. GALIK
INVENTOR.

BY Edward L. Bell

ATTORNEY

Jan. 27, 1970   G. J. GALIK   3,491,803
MACHINE FOR FILLING WITH LIQUIDS CONTAINERS
HAVING DEFORMABLE SIDE WALLS
Filed Oct. 3, 1966   3 Sheets-Sheet 3

GEZA J. GALIK
INVENTOR.

BY Edward L. Bell

ATTORNEY

United States Patent Office 3,491,803
Patented Jan. 27, 1970

3,491,803
MACHINE FOR FILLING WITH LIQUIDS CONTAINERS HAVING DEFORMABLE SIDE WALLS
Geza J. Galik, Glen Cove, N.Y., assignor to Haskon, Inc., Long Island City, N.Y., a corporation of Delaware
Filed Oct. 3, 1966, Ser. No. 583,533
Int. Cl. B65b 3/16, 43/42; B67c 3/00
U.S. Cl. 141—114
7 Claims

ABSTRACT OF THE DISCLOSURE

A machine for filling containers such as plastic jugs having side walls that bulge under the filling pressure and wherein the volume of the liquid in the container is determined by the capacity of the container, comprising means for engaging the side walls of the containers while the filling valve is open to force them inwardly and thereby reduce the volume of the container under the filling pressure to the normal capacity in the absence of such pressure, and, after the filling valve is closed, release the container to permit it to return to its normal capacity.

---

The present invention relates to filling machines and particularly to a filling machine of the type that is generally referred to as the gravity-fill type, that is, wherein liquid is introduced into the container from a reservoir through a filling valve, and wherein, when the filling valve is open, the liquid flows into the container under the pressure produced by the head of the liquid in the reservoir. A primary example of the gravity-type filling machine to which the present invention is directed is the milk bottle filling machines used in the dairy industry, and for convenience, the present invention is herein illustrated and described with respect to a machine for filling milk bottles of the one-gallon size although it will of course be readily apparent that the present invention is equally applicable to filling containers of various sizes and containers other than those which may strictly be termed bottles, and to uses other than for milk. The term "bottle" as hereinafter used is intended to include all such containers regardless of their shape, their use or the material from which they are made, so long as they otherwise are within the scope of the invention.

More particularly, the present invention relates to a filling machine for filling with liquids bottles such as milk bottles that are blow molded from a plastic material, e.g., polyethylene, and which are characterized in that the side walls thereof are deformable under the filling pressure of the liquid internally of the bottle, which pressure, when the bottle has been completely filled, comprises the full head of the liquid in the reservoir of the machine.

There are numerous advantages in the use of plastics for containers such as milk bottles in lieu of those material such as glass and paper and that are now in general use. For example, with respect to glass, the plastic bottle is less fragile and lighter, and with respect to paper, the plastic bottle is stronger and has higher impact strength, improved appearance and is less likely to develop leaks or other defects. However, primarily because of costs, plastic has been adopted for use in milk bottles only to a limited extent and then primarily only in the larger sizes, e.g., the one-gallon size, where the ratio of the cost of the container to the cost of the liquid with which it is filled is relatively low.

A further problem presented in the adoption of plastic for use in bottles is the deformability of the side walls, which is aggravated in the larger sizes and in designs having flat side walls. While the side walls of the bottle can economically be made sufficiently rigid for most purposes, the deformability of the side walls is a serious disadvantage in filling by gravity-fill type machines. Because of the relatively large surfaces that are presented, for example, in a one-gallon milk bottle and because of the pressure exerted internally of the filled bottle by the head of the liquid in the reservoir of the filling machine, the sides of the bottles bulge outwardly, thereby increasing the volume or the capacity of the bottle. In this manner, an excess of liquid is introduced into the bottle. In addition to the fact that such excess liquid is prohibitive from the standpoint of costs, it has a further disadvantage in that when the bottle is released by the filling head and the side walls recover from their bulged condition, thus reducing the bottle to its normal volume, this excess liquid is forced out and is spilled over the filling machine.

Heretofore, when plastic milk bottles have been used, they have usually been filled volumetrically where a measured volume of milk is introduced into the bottle. There are, however, now in use a great number of existing filling machines of the gravity-fill type that were designed specifically for filling rigid glass containers. These machines represent a large capital investment and the prospects for the adoption of plastic for milk bottles would be improved if they were capable of being filled on such machines without significant modification of the machine or other expenses.

In accordance with the above, it is an object of the present invention to provide a filling machine of the gravity-fill type for filling with a liquid bottles such as plastic bottles having deformable side walls that bulge under the filling pressure, which machine is adapted to fill the container to its normal capacity without overfilling the same because of the increased volume of the bottle caused by the bulging thereof and without the spilling of the liquid when the excess is forced out of the bottle upon release of the filling pressure. A further object of this invention is to provide a filling machine of the gravity-fill type adapted to fill bottles with deformable side walls, which machine requires a minimum modification of existing filling machines and is therefore economical and requires a minimum investment. Other objects of this invention are to provide such a filling machine that is efficient, dependable, and trouble-free in operation and which will function at the speeds of existing filling machines.

Further objects of this invention will be apparent from an understanding of the preferred embodiment of the invention that is hereinafter described in connection with the accompanying drawings, in which.

Figures 1, 4, 5:
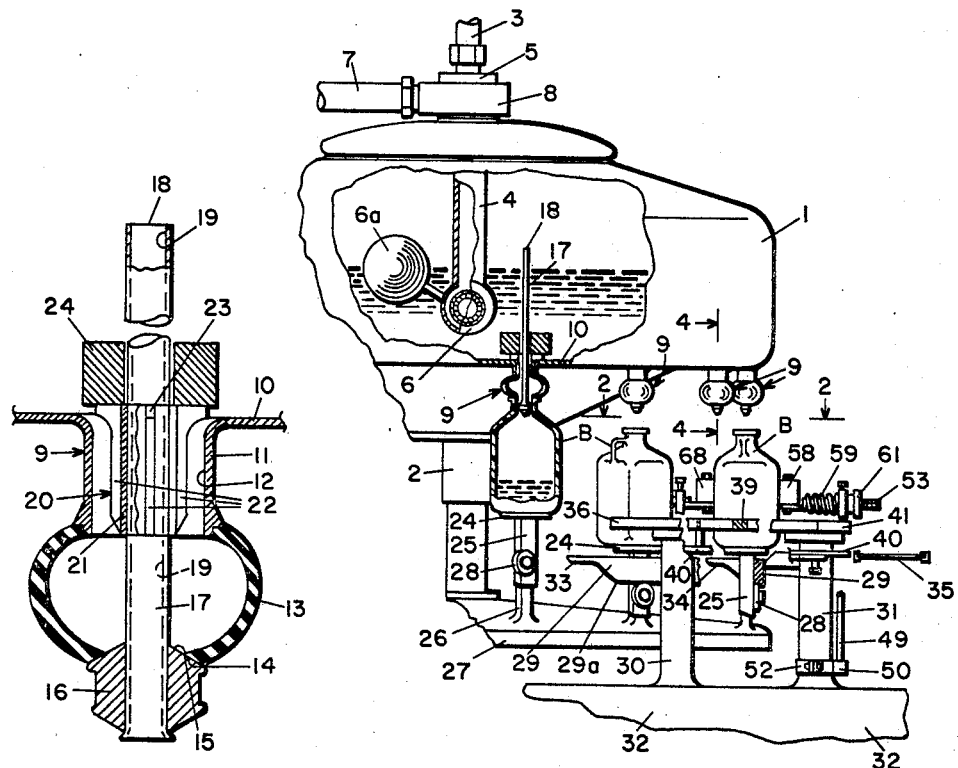
FIG. 1 is a fragmentary elevational view of a gravity-fill type filling machine embodying the present invention, with parts of the machine broken away to illustrate the machine more clearly.
FIG. 4 is a detail sectional view of a filling valve of FIG. 1 and taken substantially on the line 4—4 of FIG. 1.
FIG. 5 is a detail view, partly in section and partly in elevation, illustrating the bottle volume adjusting means in accordance with this invention.

With reference to the drawings, there is illustrated somewhat diagrammatically in FIG. 1 a conventional gravity-fill type bottle filling machine having a liquid reservoir 1 in the form of a tank that is adapted to contain a supply of the liquid with which the bottles are to be filled, which liquid in the illustrated embodiment is milk.

In the machine illustrated in FIG. 1, the reservoir 1 is mounted for rotating about a vertical axis upon a central post 2 and is adapted to be filled with liquid to the desired level by a feed line 3 that is connected to a tube 4 depending into the reservoir 1 from a slip coupling 5 that provides for rotation of the tank 1 relative to the feed line 3. The tube 4 has a sleeve type valve 6 at its lower or output end, which valve is controlled by a float 6a whereby the level of the liquid in the reservoir 1 is automatically maintained at the desired level. A vacuum is drawn on the reservoir 1 above the level of the liquid therein by a vacuum line 7 that is connected at one end to the reservoir 1 through a slip coupling 8 and connected at its other end to a source of vacuum (not shown).

The reservoir 1 is provided with a plurality of filler valves 9 that extend downwardly from the bottom wall 10 of the reservoir 1 and are spaced about the outer edge therof. Each of the filler valves 9 comprises a sleeve 11 depending from the bottom wall 10 of the reservoir 1 and having an axial bore 12 that communicates with the interior of the reservoir 1. The sleeve 11 carries at its lower end a resilient, deformable valve body 13 that is formed with a valve seat 14 adapted to cooperate with the seating surface 15 of a valve head 16. The valve head 16 is secured to the lower end of a tube 17 that extends upwardly through the valve body 13 and the bore 12 of the sleeve 11 into the reservoir 1 with the upper end 18 thereof terminating at a point above the level of the liquid in the reservoir whereby the bore 19 of the tube is open to the vacuum in the reservoir for the purpose of drawing off in the usual manner the foam that is normally formed in milk bottles during filling.

The tube 17 of each of the valves 9 is supported by a spider 20 that includes a hub 21 surrounding and secured to the tube 17 and having a plurality, e.g., three, radially extending ribs 22 that engage the walls of the sleeve 11 to position the spider and thus the tube 17 within the sleeve 11. At their upper ends, the ribs 22 are formed with lips 23 which rest on the bottom wall 10 of the reservoir 1 for supporting the spider 20 and thus the tube 18 vertically in the sleeve 11. The tube 17 is thus readily removable for purposes of cleaning and is adapted to be held down in its normal operative position by a weight 24 slidably mounted on the tube 17 and bearing downwardly against the spider 20.

Figure 9:
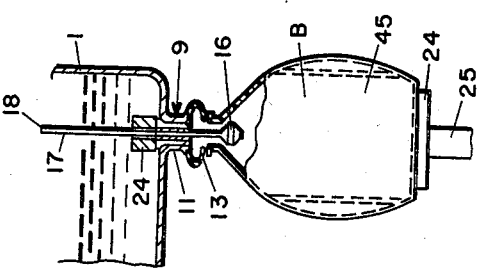

The filler valves 9 are adapted to be opened in the usual manner by forcing a bottle B upwardly against the resilient valve body 13. As illustrated in FIG. 9, the mouth of the bottle B is adapted to surround the valve head 16 and to engage the lower portion of the valve body 13 so that when the bottle B is forced upwardly, the seat 14 of the valve body 13 is lifted off the seating surface 15 of the head 16. The liquid in the reservoir 1 then cascades downwardly through the sleeve 11 into the bottle B. The head of the liquid in the reservoir 1 places the liquid under a pressure and thereby reduces the time required to fill the bottle. The air in the bottle B, as well as the foam that is developed, is drawn off through the bore 19 of the tube 17 as the bottle is filled.

For lifting the bottles B upwardly against the valve 9 there is provided beneath each valve 9 a platform 24 having a depending stem 25 that telescopes onto a post 26 upstanding from a support plate 27 rotatable with the reservoir 1. The platform 24 is normally biased to its raised or valve-open position by a compression spring (not shown) disposed between the stem 25 and the post 26 and is depressed to its lowered or valve-closed position by a cam follower 28 in the form of a roller journaled on the stem 25 and cooperating with a stationary cam 29 carried by the hollow posts 30 and 31 rising from the base member 32 of the machine. The cam 29 has a lifting surface 33 which permits the platform 24 to rise under the action of its spring bias to the valve-open position and a lowering surface 34 (FIG. 1), which forces the platform 24 down against the action of its spring bias to the valve-closed position. The cam 29 also includes a lower cam edge 29a for holding the platform 24 down to a loading and unloading level.

The bottles B are fed onto the platforms 24 in timed relation to the rotation of the platforms 24 by a bottle conveyor 35 (FIG. 2) from which the bottles are taken one at a time by a star wheel 36 mounted on a shaft 37 that is journaled longitudinally of the post 30. The wheel 36 cooperates with the guiding surface 38 of a bottle guide 39 to move the bottles B off the conveyor 35, onto and across a stationary support plate 40 which may be carried, for example, by the posts 30 and 31, and onto that one of the platforms 24 which is then in the loading position, that is, the platform that is then moving adjacent to the wheel 36 and is adapted to receive the bottle from the wheel.

Figure 2:
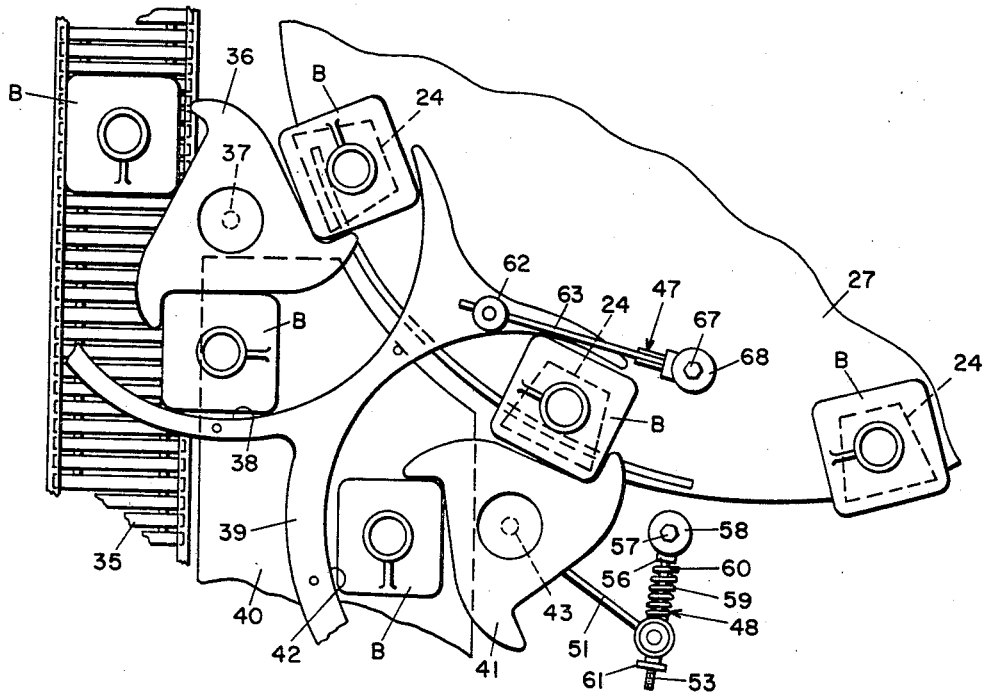
FIG. 2 is a fragmentary sectional view taken substantially on the line 2—2 of FIG. 1.

The bottles B travel from the loading position in a clockwise direction as seen in FIG. 2 to the discharge position, where they are removed from the platforms 24. The discharge position is defined by the star wheel 41 that cooperates with a bottle guiding surface 42 of the bottle guide 39 and is located as close as possible to one full turn about the axis of the center post 2 from the loading position. The wheel 41 is mounted on a shaft 43 that is journaled longitudinally of the post 31. As the wheel 41 rotates, the bottles B, as they are engaged, are moved off the platforms 24 and across the support plate 40 to a subsequent operation, which in the normal course would comprise a capping operation for closing the filled container.

During the operation of the filling machine, at the time a bottle B is moved onto the platform 24, the platform is in its lowered position and the valve 9 is closed. Immediately after a bottle is loaded onto a platform 24, the platform 24 is raised by its spring bias which is released by the cam lifting surface 33 of the cam 24 to force the bottle upwardly and thereby open the valve 9 to begin filling the bottle. Filling continues as the bottle moves with the reservoir 1 and the valve 9 and platform 24 to the discharge position. Shortly before reaching the discharge position, the platform 24 is lowered against the action of its spring bias by the cam lowering surface 34 of the cam 29 to close the valve 9 and to release the bottle. At the discharge position, the fiilled bottle is moved off the platform 24 and to the next operation. The lowered and empty platform 24 then continues to the loading position, where it receives another bottle and thus endlessly receive bottles and carries them through the filling operation to the discharge position.

The speed at which the reservoir 1 is rotated, and thus the time interval during which the bottle is connected through the valve 9 to the reservoir 1 and is being filled, is limited only by the time required to fill the bottle completely, including the elimination of the foam developed during filling.

Figure 3:
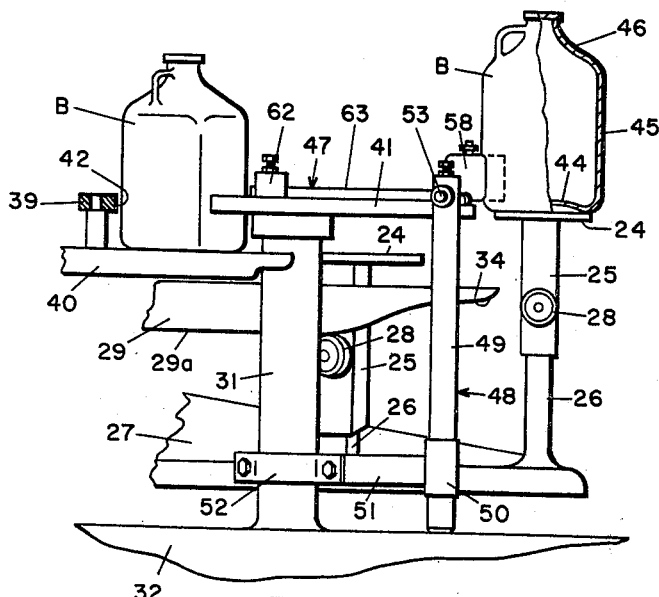
FIG. 3 is a fragmentary view illustrating in elevation that portion of the machine of FIG. 1 at the unloading or discharge position.
Figure 8:
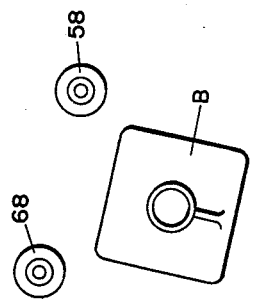
FIGS. 6, 7 and 8 are schematic views illustrating in plan the relative position of the volume adjusting means and a bottle in successive positions before, at and after the closing of the filling valve.
Figure 11:
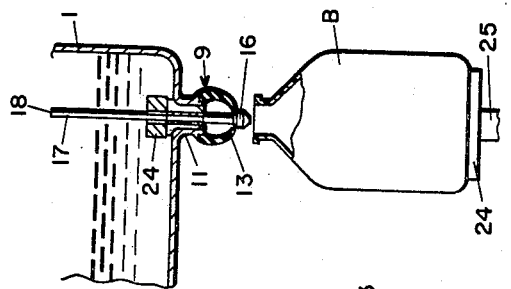
FIGS. 9, 10 and 11 are schematic views illustrating in elevation the relative position of the volume adjusting means and the bottle in the different positions illustrated respectively in FIGS. 6, 7 and 8.

In a gravity-fill type machine, the bottle is filled completely so that there is a solid column of liquid from the reservoir through the sleeve 11 to the bottle. With such machines, the bottle itself thus constitutes the means for measuring the volume of the liquid introduced into the bottle and with rigid bottles such as glass, which has heretofore generally been used, for example, for one-gallon milk bottles, the bottle has a fixed capacity. However, with plastic bottles such as the bottle B, which, as shown in FIG. 3, include a bottom 44, four flat side walls 45 and a neck 46, and particularly large size bottles such as one-gallon milk bottles, the side walls are deformable under the filling pressure that is imposed because of the head of the liquid in the reservoir 1. As shown in FIG. 9, where the illustration is exaggerated for emphasis, the side walls 45 of the bottle B tend to bulge under the filling pressure thereby increasing the capacity of the bottle and providing for the introduction into the bottle of a volume of liquid that is in excess of the designed capacity of the bottle. When the bottle is released from the filling pressure and thus recovers its normal shape, the capacity of the bottle is reduced and this excess liquid is then forced out through the mouth of the bottle and is thus spilled over the filling machine at the discharge station. In addition to the cleaning problem that is thus presented, such a loss in a highly competitive industry such as the milk industry is a prohibitive cost.

While the practice heretofore has been to fill plastic bottles volumetrically, such filling requires expensive new filling machines or modifications of existing machines while the prospective user may have a number of gravity-fill type filling machines. Thus, in addition to the other factors involved, there is a reluctance on the part of the prospective users of plastic milk bottles to adopt the same because of this additional expense. In accordance with this invention, there has been provided a simple and inexpensive means for adapting existing gravity-filled type filling machines for filling bottles with deformable side walls and particularly for filling large size plastic milk bottles. The means in accordance with this invention comprises a pair of opposed roller assemblies 47 and 48 that are adapted to engage the bottle and to squeeze the side walls 45 thereof, thereby adjusting the volume of the bottle. Of these, the roller assembly 48, which is mounted radially outwardly of the path traversed by the milk bottles during the filling operation, comprises a vertical supporting column 49 that is carried by the hub 50 of a bracket 51 that includes a strap 52 surrounding and secured to the post 31. A rod 53 extends loosely through a horizontal bore in the upper end of the column 49 and is held against turning by means of a bolt 54 that engages a flat 55 on the rod 53. At its end adjacent to the path of the bottles, there is secured to the rod 53 a plate 56 that in turn carries a vertical stud 57 on which is rotatably mounted a roller 58. The rod 53 is biased inwardly toward the path of the bottles by a spring 59 surrounding the same and abutting at its opposite ends against the rod 49 and a shoulder 60 on the plate 56. Movement of the rod 53 under the action of the spring 59 is adjustably limited by a stop nut 61 threaded onto the end of the rod 53 and adapted to abut against the column 49.

The inner roller assembly 48 comprises a short column 62 carried by the bottle guide 39 and having a rod 63 extending through a bore 64 therein. The rod 63 is adjustably secured in the bore 64 by a bolt 65 and carries at its end adjacent to the path of the bottles B a supporting plate 66 which in turn carries an upstanding stud 67 on which is journaled a roller 68.

Figure 7:
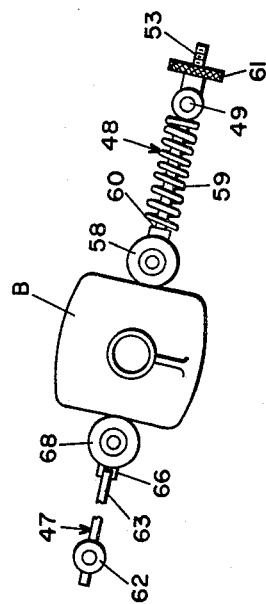
Figure 10:
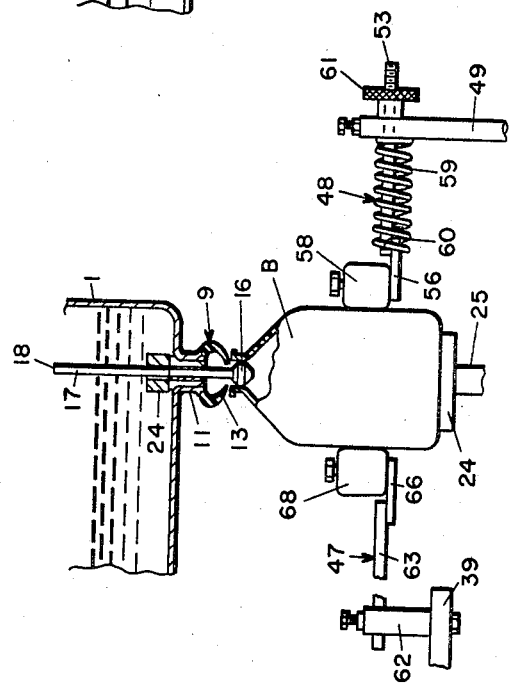

The roller assemblies 47 and 48 are mounted in position so that the rollers 58 and 68 thereof engage the bottles about midway vertically of an opposed pair of the side walls 45 of the bottle B and at that time in the cycle when the bottle is approaching the discharge station. More particularly, the rollers become operative at the time in the filling cycle from just before the valve 9 closes until after the valve 9 is closed. Thus, at the time the rollers 58 and 68 initially engage the side walls 45, the bottle is connected through the open valve 9 to the reservoir and, being full, is therefore bulged under the pressure exerted internally thereof by the head of the liquid in the reservoir 1. At the same time, because the rollers 58 and 68 remain in engagement with the opposed pair of side walls 45 of the bottle until after the valve 9 has closed, when the bottle is released by the rollers it is not in communication with the reservoir and not subjected internally to the filling pressure. Preferably, the valve 9 is closed while the rollers 58 and 68 are at the transverse midpoint on the side walls 45 as illustrated in FIGS. 7 and 10.

The roller assembly 48 is adjusted by means of the stop nut 61 so that the spacing between the rollers 58 and 68 will force the engaged opposed pair of side walls 45 of the bottle B inwardly by an amount that is sufficient to reduce the volume of the bottle under the filling pressure to the desired capacity of the bottle in the absence of the filling pressure. Since the pair of side walls intermediate the engaged opposed pair is also bulged under the filling pressure, it is usually necessary to force the engaged opposed pair of side walls inwardly to a concave condition in order to reduce the volume of the bottle the required amount.

The resilient mounting of the roller 58 that is afforded by the spring 59 provides for movement of the rollers over the corners of the bottles B without crushing them.

Figure 6:
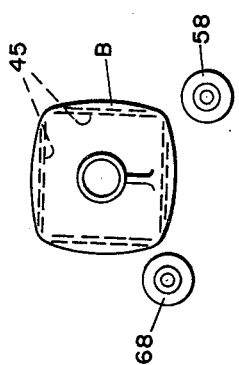

The operation of the roller assemblies 47 and 48 is illustrated in FIGS. 6–11. With reference to FIGS. 6 and 9, the illustrated bottle B is shown at that point in the filling cycle when it is approaching the discharge station and after it has become filled. At this point, the valve 9 is open and the bottle B is subjected internally to the filling pressure so that it is bulged, which for purposes of illustration is exaggerated in FIG. 9, and contains an excess of liquid. The bottle B is also approaching the rollers 58 and 68.

As illustrated in FIGS. 7 and 10, the bottle has advanced from the position of FIGS. 6 and 9 to the position in which it has passed between the rollers 58 and 68 which have forced the engaged opposed pair of side walls inwardly from the bulged condition of FIGS. 6 and 9. As the side walls are pushed in by the rollers 58 and 68, the volume of the bottle is reduced and the excess milk is thus forced from the bottle B through the valve 9 back into the reservoir 1. The amount that the side walls must be pushed in to obtain the required correction in the volume of the bottle depends upon various factors such as the shape of the bottle, the rigidity of the side walls and the filling pressures, and can be readily adjusted through the adjustable mounting of the rollers 58 and 68 in accordance with the fill level of the bottles leaving the machine.

As the bottle is advanced from the position of FIGS. 6 and 9 to the position of FIGS. 7 and 10, the lowering surface 34 of the cam 29 acts upon the roller 28 to lower the platform 24 and thus to lower the bottle B from the valve-open position to the valve-closed position. The timing relation of the cam surface 24 and rollers 58 and 68 is preferably such that at the time that the rollers 58 and 68 effect a maximum compression of the engaged side walls of the bottle, the valve 9 closes. In this manner, when the bottle passes from between the rollers, that is, to the position illustrated in FIGS. 8 and 11, it is not connected to the reservoir 1. Upon release from the pressure of the liquid in the reservoir 1 by closing the valve 9 and upon release of the engaged side walls of the bottle B by the rollers 58 and 68, the bottle recovers. Thus, the side walls of the bottle B intermediate the side walls engaged by the rollers 58 and 68 and which remained bulged under the pressure of the head of the liquid in the reservoir 1, recover inwardly while the side walls engaged by the rollers 58 and 68, which were pushed or squeezed inwardly, move outwardly. The net effect is that the level of the milk in the bottle when it is released is at the desired level without spilling.

What I claim and desire to protect by Letters Patent is:

1. In a filling machine having means for introducing liquids under a filling pressure into a container having side walls deformable under such filling pressure and wherein the volume of liquid introduced into the container is determined by the capacity of the container, said machine comprising a reservoir for a liquid with which the containers are to be filled, a plurality of filling valves on said reservoir, means for supporting individual containers in filling relation with respect to said valves and for opening and closing said valves as containers are moved into and out of filling relation therewith whereby a valve is open when a container is in filling relation with respect thereto and remains open until the container is filled to provide a continuous volume of liquid from the container to the reservoir and is closed when no container is in filling relation with respect thereto, and means for preventing introduction of an excess of liquid into the container under the filling pressure comprising means for engaging a side wall of the container and for forcing the same inwardly during the filling operation from before the filling valve closes until after the filling valve has closed and thereafter releasing the container to permit the container to return to its normal capacity, thereby reducing the capacity of the container under the filling pressure to the capacity that is normal in the absence of such pressure whereby any liquid in excess of the normal capacity of the container that is in the container when said engaging means becomes operative is forced back through the filling valve into the reservoir and the introduction of any further liquid into the container during the filling operation is limited to the normal capacity of the container.

2. In a filling machine in accordance with claim 1 in which said reservoir is rotatable and said means for supporting said containers in filling relation to said filling valves comprises platforms movable with said reservoir, and means for raising and lowering said platforms relative to said filling valves for opening and closing the same.

3. In a filling machine in accordance with claim 2 in which said means for raising and lowering said platforms comprises a stationary cam adapted to cooperate with a cam follower on said platform and rotatable therewith.

4. In a filling machine in accordance with claim 1 in which the filling pressure of the liquid is developed by the head of the liquid in said reservoir.

5. In a filling machine in accordance with claim 1 in which said means for engaging said side walls comprise a pair of opposed rollers spaced apart a distance less than the maximum spacing of the side walls of the bottle in the bulged condition under the filling pressure.

6. In a filling machine in accordance with claim 5 in which one of said rollers is resiliently mounted for movement away from the other of said rollers.

7. In a filling machine in accordance with claim 6 in which said resiliently mounted roller is carried by a rod that is spring biased toward the other of said rollers and having an adjustable stop nut threaded thereon.

References Cited

UNITED STATES PATENTS

| | | | |
|---|---|---|---|
| 1,961,563 | 6/1934 | Luckie | 141—148 X |
| 2,339,896 | 1/1944 | Waters | 141—114 X |
| 2,378,920 | 6/1945 | Gillican | 141—114 X |
| 2,601,944 | 7/1952 | Hansen | 141—77 X |
| 2,781,799 | 2/1957 | Bradford | 141—77 X |
| 3,052,269 | 9/1962 | Manas | 141—166 X |
| 3,083,780 | 4/1963 | Swenson | 141—68 X |
| 3,108,901 | 10/1963 | Cox | 141—316 X |

SAMUEL ROTHBERG, Primary Examiner

E. J. EARLS, Assistant Examiner

U.S. Cl. X.R.
53—282; 141—116, 150